Figure 1:
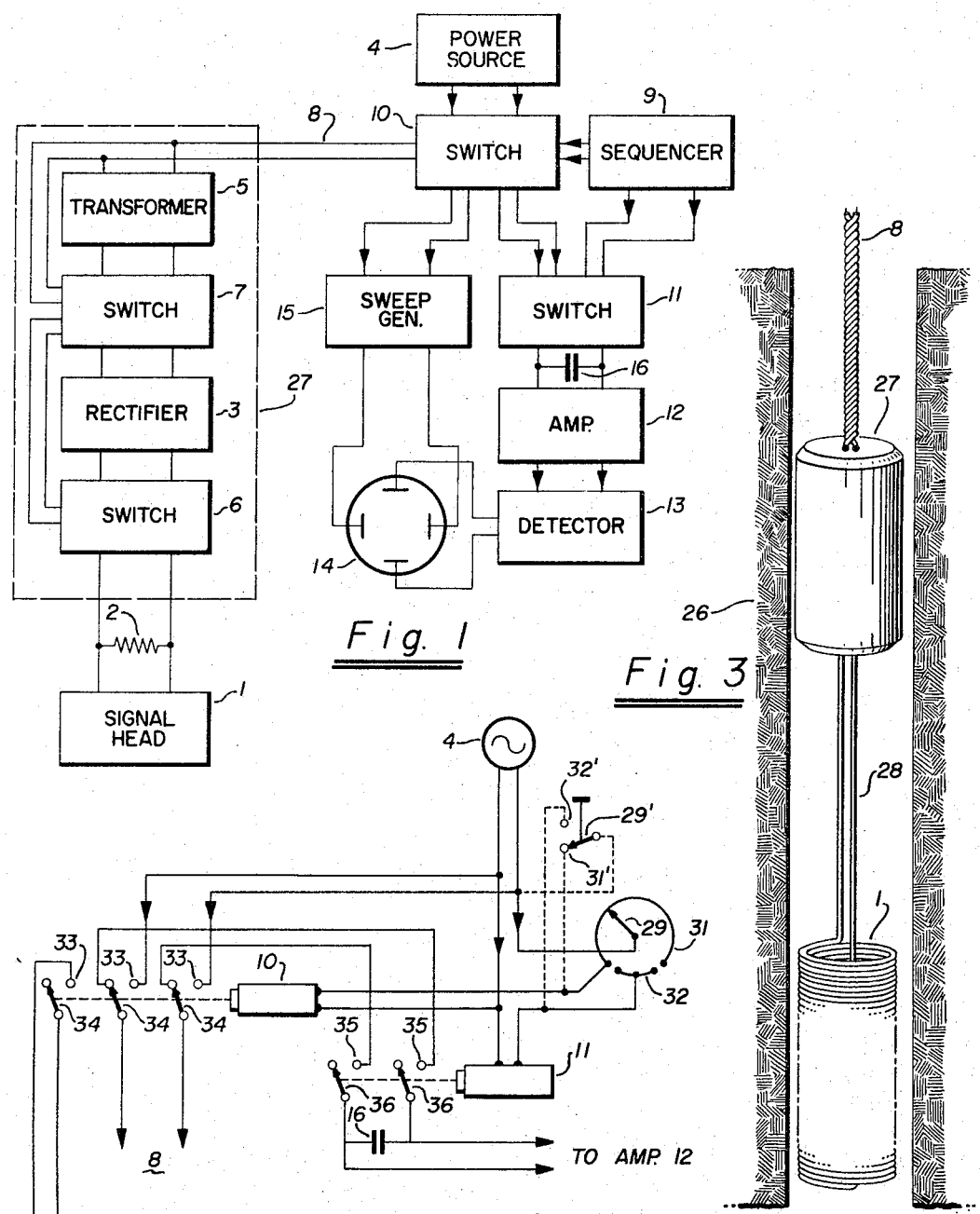

INVENTORS
Arnold L. Bloom &
Dolen L. Mansir

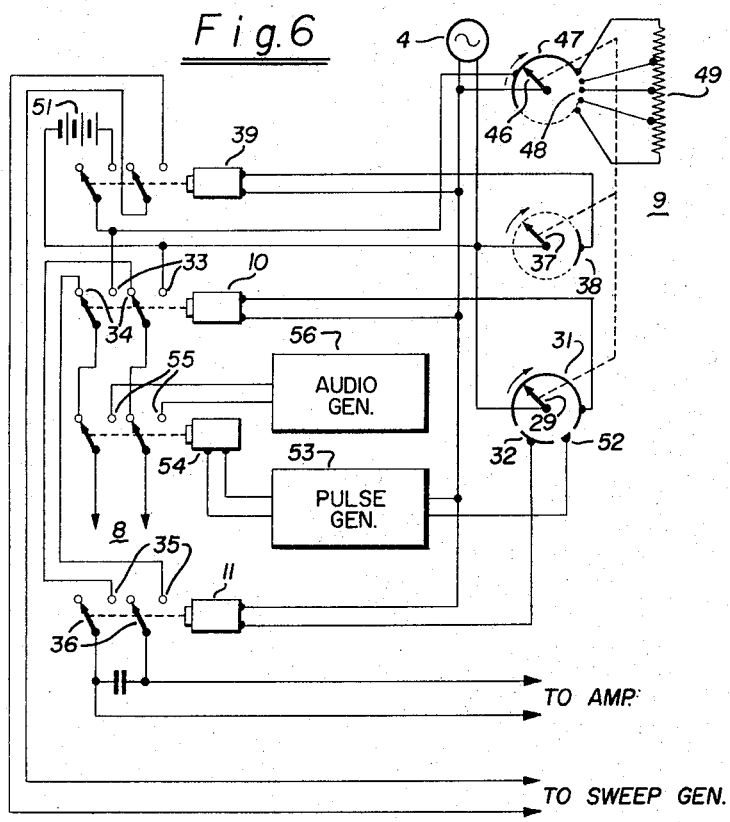

3,360,716
GYROMAGNETIC RESONANCE METHODS AND APPARATUS
Arnold L. Bloom, Menlo Park, and Dolan L. Mansir, Los Altos, Calif., assignors to Varian Associates, San Carlos, Calif., a corporation of California
Original application Aug. 6, 1956, Ser. No. 602,127. Divided and this application Feb. 23, 1965, Ser. No. 434,508
6 Claims. (Cl. 324—.5)

This application is a division of copending application Serial No. 602,127 filed Aug. 6, 1956, now abandoned, for improvements in Gyromagnetic Resonance Methods and Apparatus.

This invention relates generally to the field of gyromagnetic resonance and the invention has reference, more particularly, to the measurement of the thermal relaxation time ($T_1$) of gyromagnetic atom portions, such as nuceli, in magnetic fields, said measurement being made of freely precessing atom portions, the said invention being especially useful in connection with chemical analysis and exploring oil wells.

There is disclosed in U.S. paten application Ser. No. 264,821 filed Jan. 3, 1952, by Russell H. Varian, entitled, "Apparatus and Method for Identifying Substances," a gyromagnetic resonance system for determining the presence of certain substances by the measurement of the signal decay relaxation time ($T_2$), i.e., the time it takes for freely precessing atom portions, such as protons, to reach a predetermined state of out-of-phase precession. Such a measurement is particularly useful in determining the presence and relative quantity of oil protons in a well bore. The present invention discloses methods and means for determining thermal relaxation times ($T_1$) of such atom portions, such relaxation times $T_1$ being valuable in many instances for chemically analyzing substances such as, for example, oil in a well bore.

The object of the present invention is to provide novel methods and means for determining the presence of desired compounds by means of the thermal relaxation time ($T_1$) of their nuclear interactions in magnetic fields.

One feature of the present invention is the provision of a novel method and means for polarizing the gyromagnetic atom portions in a sample of matter located in a first magnetic field in a series of successive stages, the polarization changing in strength progressively in the stages, and detecting the free precession of the atom portions in the first magnetic field after each stage of polarization, the initial amplitude of the free precession signals varying in accordance with the strength of polarization, the envelope of these successive initial amplitudes producing a polarization curve from which the thermal relaxation time of the sample may be determined.

Another feature of the present invention is the provision of a novel and accurate method and means for detecting the presence of petroleum beneath the earth's surface; the said method comprising inserting into a bore in the earth the novel means of this invention capable of producing and detecting precessions of nuclei and measuring the thermal relaxation times ($T_1$) of such nuclei, to thereby accurately determine the presence of petroleum owing to the known precessional properties of petroleum.

Still another feature of the present invention is to provide method and apparatus to determine the thermal relaxation time in the same magnetic field used for observing nuclear precession by setting up a polarizing magnetic field for polarizing the nuclei, reducing said field preferably to zero in such a way that the nuclei remain oriented in the precession field, without precessing, and then induce precession by applying a pulse of alternating magnetic field at the precession frequency.

Other features and advantages of the present invention will become apparent from a perusal of the following specification taken in connection with the accompanying drawings wherein the invention is embodied in concrete form.

Figure 2:
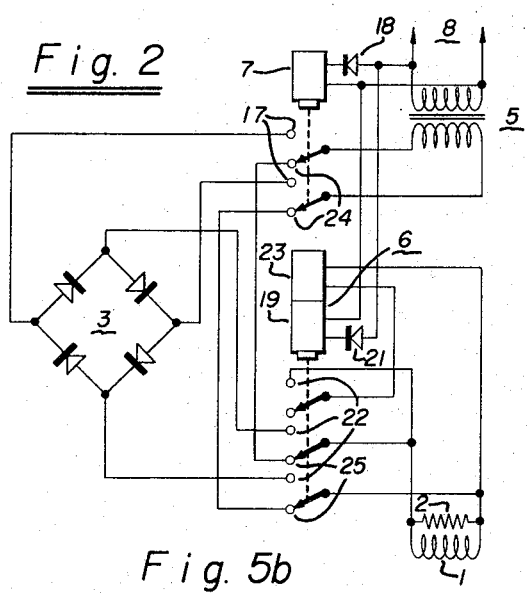
Figure 5A:
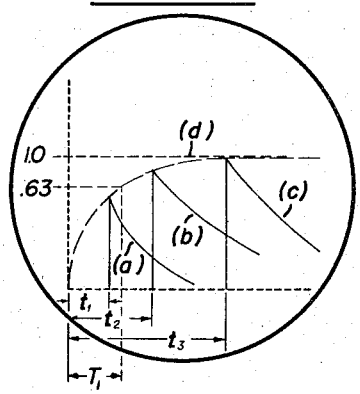
Figure 5B:
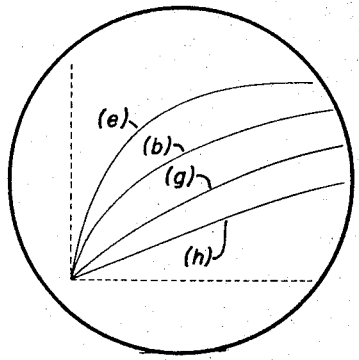
Figure 7A:
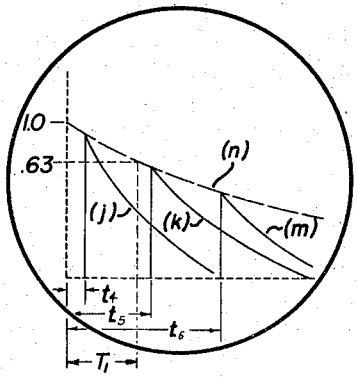
Figure 7B:
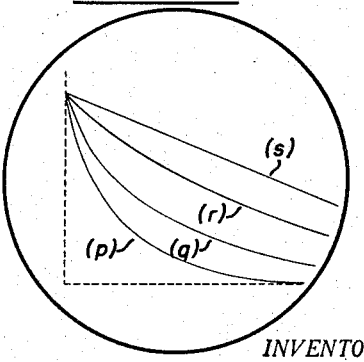

In the drawings:

FIG. 1 is a block diagram showing the principal components of a well logging apparatus which embodies the present invention, FIG. 2 is a circuit diagram of components of FIG. 1 adapted to be inserted into a well bore, FIG. 3 is a general view of the signal apparatus of FIG. 1 suspended in a well, FIG. 4 is a circuit diagram of the sequencing circuit of FIG. 1, FIG. 5a shows typical superimposed oscilloscope traces produced by the apparatus of FIG. 1, FIG. 5b shows a plurality of polarization decay curves produced for different mixtures of chemical substances, each curve showing a mixture having different proportions of chemical substances, FIG. 6 shows in block diagram form a preferred embodiment of the present invention for determining thermal relaxation times of gyromagnetic atom portions such as nuclei, FIG. 7a shows typical superimposed oscilloscope traces obtained with the apparatus of FIG. 6, and FIG. 7b shows a plurality of polarization decay curves produced for different mixtures of chemical substances, each curve showing a mixture having different proportions of chemical substances.

Similar reference numerals are used in all of the above figures to indicate corresponding parts.

In order for the reader to understand the principles of the present invention, it is essential that he be acquainted with the fundamental principles of free precession nuclear induction. In this connection, attention is called to U.S. Patent No. Re. 23,679 issued Jan. 12, 1954, to Russell H. Varian entitled "Method and Means for Correlating Nuclear Properties of Atoms and Magnetic Fields."

There are essentially two independent and different sources of the damping forces in nuclear magnetic resonance. The first of these is the interaction of the precessing nuclei with the surrounding matter, which may cause the nucleaus to transfer its energy of precession to the motion of nearby atoms. This damping force is truly a frictional force, for like the large-scale mechanical frictional forces, it changes kinetic energy into thermal energy. The second source of damping out of a signal is caused by the fact that not all nuclei are in exactly the same magnetic field and therefore do not have exactly the same precession frequency. As a result, nuclei which at a given time are precessing in phase, that is, with their axes all pointing in the same direction, may, after a sufficient amount of time, end up precessing in various phases. When this occurs it will be impossible to detect the presence of the precessions, even though the individual nuclei are precessing as before. Since the latter effect can be influenced by factors other than the properties of the matter containing the nuclei, it is desirable to measure the nuclear precession in such a way as to eliminate the effects other than the true damping or frictional forces. This can be accomplished by measuring the initial amplitude of the precessional signal as a function of the length of time the nucleus spends in a given polarizing magnetic field.

A quantity of great importance for present purposes is the time required for these damping forces to act and effect a change in polarization of the nuclei, and this time we call the thermal relaxation time ($T_1$). Experiment shows that this time may have values extending from $10^{-3}$ seconds or less to many minutes or more. From the above discussion on the source of the damping forces it is obvious that the thermal relaxation time depends on the surroundings of the individual nuclei. Thus, the nature of the compound containing the nucleus, the state of the substance, whether solid, liquid, or gas, the presence of dissolved foreign materials, and the temperature are some of the factors that influence the thermal relaxation time. Each substance in the pure state has its own characteristic thermal relaxation time.

For example, since the molecular composition of oil is quite different from that of water, the nuclear relaxation time for constituent hydrogen nuclei (or protons) is quite different for oil than for water. The present invention is particularly suited to detect oil even in the presence of water by virtue of said difference in thermal relaxation times.

The following description of the embodiment of this invention describes the apparatus as designed for use in an oil well. However, other shapes and forms of the invention suitable for use in other fields such as, for example, process control or laboratory chemical analysis are to be considered within the scope of this invention.

Referring now to FIGS. 1 and 3, there is shown in block diagram form certain apparatus making up the embodiment of the present invention, subsequently described FIGS. 2, 4 and 8 showing certain portions of this apparatus in more circuit detail. Reference numeral 1 designates a signal head adapted to be lowered into a well bore consisting of a coil of wire which serves the double purpose of applying a strong magnetic field to the sample, to produce nuclear polarization of the same, and picking up the signal produced by atomic nuclei precessing in the earth's magnetic field. A non-linear resistor 2 is connected in parallel with coil 1, which makes it possible for the D.C. magnetic field to be quickly damped out but limits the voltage surge, when the circuit is opened, to safe values when it is desired to pick up the nuclear free precessions. A rectifier 3 is utilized to rectify A.C., supplied from power source 4 above ground, into D.C. for use by coil 1, so that said coil may produce a steady magnetic field at an angle to the earth's magnetic field. Transformer 5 serves the double purpose of stepping down the A.C. power supplied from above ground before application to rectifier 3, and of stepping up the weak nuclear induction voltage signals so that said signals may be transmitted to the sensitive detecting apparatus located above ground. Switches 6 and 7 are employed for switching rectifier 3 in and out of the circuit of coil 1, depending on whether or not coil 1 is being used for producing a polarizing D.C. magnetic field or for picking up the nuclear precession signals. The operation of switches 6 and 7 is controlled by the presence or absence of A.C. supply voltage on transformer 5; said operation will be discussed in a later part of this specification.

The parts of the apparatus heretofore described, except power supply 4, are designed to be lowered into the well hole. They are suspended by cable 8 which also provides electrical conduits for supplying A.C. power to components within the well and for transmitting nuclear precession signals picked up by same to the surface. The remainder of the apparatus may be located above ground. Said apparatus comprises power source 4, which supplies A.C. power to the entire system, sequencer 9, which determines the time sequence of switching events, switches 10 and 11, amplifier 12, detector 13, cathode ray oscilloscope 14, and its associated horizontal sweep generator 15.

One possible operation of this apparatus is as follows. The sequence 9 is arranged to operate switch 10 so as to connect cable 8 directly to power source 4 a plurality of times, the first time period during which relay 10 is held operated being substantially less than the estimated thermal relaxation time of the sample and each successive time period of operation of relay 10 being progressively longer, the last time period being somewhat longer than the estimated thermal relaxation time. For example, for water protons, the thermal relaxation time in the earth's field is about three seconds and the first operation time for switch 10 would be about one second while the last operation time would be about six seconds. During each pulse of A.C. on cable 8, switches 6 and 7 operate so as to connect coil 1 to the power source 4 via rectifier 3 and transformer 5. Coil 1 is thus producing a steady polarizing magnetic field in the sample, i.e., the earth and material surrounding the coil in the well. After each successive operation of switch 10, sequencer 9 operates switch 10 so as to disconnect cable 8 from power source 4 and thus remove the polarizing magnetic field. With no power on cable 8, switches 6 and 7 act in such a way as to connect coil 1 directly to transformer. Coil 1 can then transmit nuclear free precession signals to the surface via transformer 5 and cable 8 after each successive polarization pulse. After sufficient time has elapsed to allow the switching operation of switches 6 and 7 to take place, sequencer 9 operates switch 11 so as to connect cable 8 to amplifier 12. A condenser 16 shunted across the input of amplifier 12 forms a tuned circuit comprising said condenser, transformer 5 and coil 1. Said tuned circuit is tuned approximately to the frequency of the precessions picked up by coil 1. The series of successive nuclear induction signals produced in coil 1 are thus impressed on amplifier 12, and the amplifier signals are impressed on detector 13, which rectifies the alternating component of the signals and leaves only the exponentially decaying envelope. Each successive envelope signal is impressed on the vertical sweep of a cathode ray oscilloscope 14. The horizontal sweep of oscilloscope 14 is driven by a sweep generator 15 which starts the sweep each time switch 10 is actuated. The horizontal sweep thus starts at the same instant of time as each pulse of polarizing field is applied. The series of oscilloscope traces may be viewed directly or they may be photographed for inspection at a later time.

Thus it is clear that the device herein described polarizes the nuclei in a sample in a series of pulses of progressively longer periods of time, turns the polarizing field off after each pulse, then detects the free precession of the nuclei in the sample in the earth's magnetic field after each polarization, and presents the successive free precession signals on the viewing screen of an oscilloscope. From the amplitudes and position of the successive signals on the oscilloscope screen, and the speed of the horizontal sweep of the oscilloscope, the thermal relaxation time $T_1$ of the sample may be readily determined as illustrated by FIG. 5a which shows typical superimposed oscilloscope traces of nuclear free precession signals of protons in a mixture of oil and water produced by this embodiment when the horizontal sweep is a linear function of time. Trace $a$ shows the free precession signal which is obtained when the polarizing magnetic field is left on for a time ($t_1$) somewhat shorter than the thermal relaxation time of the nuclei, where the thermal relaxation time ($T_1$) refers to the length of time of polarization it takes to obtain a nuclear free precession signal with an amplitude 63% of the amplitude of the free precession signal obtained after full polarization. Trace $b$ shows the free precession signal when the polarizing time ($t_2$) is slightly longer than the thermal relaxation time. Trace $c$ shows the free precession signal when the polarizing time ($t_3$) is still longer than the relaxation time. It will be observed that the peak amplitudes of all these traces describe another curve $d$ which shows directly how the nuclear polarization builds up as the polarizing time is increased. Thus curve $d$ indicates the thermal relaxation time of the substance containing the nuclei.

FIG. 5b shows a plurality of superimposed thermal relaxation curves, trace $e$ showing the curve for a substance A and trace $h$ showing a curve for a substance B which has a relaxation time approximately ten times that of substance A. Traces $f$ and $g$ show the results of mixtures of the two substances in the proportions ⅔A+⅓B and ⅓A+⅔B, respectively. Thus it is easy to see how one may chemically analyze a substance or a mixture of substances of different relaxation times by means of the polarization decay curves.

A circuit diagram of the electrical apparatus of FIGS. 1 and 3 in the well is shown in detail in FIG. 2. Owing to the fact that this apparatus is partially isolated from its power supply, thermionic elements are preferably not used and only simple mechanical relays and dry rectifiers are employed. When A.C. power is supplied on cable 8 D.C. switch 7 is actuated, through rectifier 18, so that the blades thereof engage contacts 17. Switch 6, a polarized relay, is also actuated because one of its two actuating coils 19 is energized from the A.C. supply via a small rectifier 21, so that its blades engage contacts 22. Power is thus transmitted via transformer 5 to rectifier 3, which in turn supplies coil 1 with rectified A.C. current inductance of coil 1 is sufficient to filter the rectified A.C. into the necessary direct current. The actuation of switch 6 also closes the circuit for its holding coil 23, which is sensitive to voltages across coil 1.

When A.C. power is removed from line 8 by the above-mentioned action of switch 10, switch 7 releases so that its contacts 24 are engaged, whereupon rectifier 3 is disconnected from transformer 5. Rectifier 3 is designed so that no D.C. current flows through transformer 5, thus no objectionable transient voltages are produced across transformer 5 by this switching process. The decay of current in coil 1 is hastened by dissipation through non-linear resistor 2. The rapid decay of current through coil 1 produces large transient voltages across said coil; to prevent said transient voltages from entering and possibly damaging transformer 5, the holding coil 23, sensitive to voltages across coil 1, holds switch 6 with contacts 22 engaged, for in this position coil 1 remains connected to rectifier 3 which is now disconnected from transformer 5. When the transient voltage has nearly died out, holding coil 23 can no longer hold switch 6 and, after a short time determined by viscosity damping, the blades of switch 6 engage contacts 25, thereby connecting coil 1 directly to transformer 5 so that nuclear free precession signals can be transmitted to the surface.

FIG. 3 shows those parts of the apparatus that are lowered into the well bore as they actually appear in the well. The coil 1 is the lowest part of the apparatus. In this particular embodiment it is a solenoid with its axis parallel to the axis of the well and with diameter nearly equal to that of the well. The "sample" which supplies the nuclear precessions is in this case the matter and earth walls of the well 26 surrounding the coil, and since a signal may be obtained from signal producing material inside the coil as well as outside, the form on which the coil is mounted should contain no material which can produce a confusing signal. The form must also be non-conducting and capable of withstanding the high temperatures and pressures encountered in a deep well. The other components of the apparatus inside the well are enclosed in a casing 27 from which coil 1 is suspended by a short length of cable illustrated as lead wires 28. The distance between casing 27 and coil 1 must be great enough so that ferromagnetic substances in container 27 do not appreciably perturb the magnetic fields around coil 1, but not so great that appreciable power losses are produced in cable 28. Cable 8 extends to the surface above container 27.

FIG. 4 shows the switching circuit above the surface comprising sequencer 9, switch 10 and switch 11. Sequencer 9 consists of a motor controlled switch having a moving brush 29 and ring segments 31 and 32. When contact by brush 29 is made with segment 31, switch 10 is actuated by current from source 4, whereby contacts 33 are engaged by blades 34 to close the power source 4 to the cable 8; similarly, when brush 29 engages segment 32, switch 11 is actuated so that contacts 35 are engaged by blades 36 and the cable 8 is coupled through to amplifier 12. The time delay between the release of switch 10 and the actuation of switch 11 (or vice versa) is provided by an open space between segments 31 and 32. Alternatively, the sequencer may be a manually operated switch 29' and switch contacts 31' and 32'. Although the switches shown in this description have mechanical contacts, electronic gates would be equally suitable. The different lengths of time of polarizing ($t_1$, $t_2$, $t_3$ in FIG. 5a) may be determined by changing the length of ring segment 31 for successive polarizations or by successively changing the rotational speed of brush 29 for succeeding polarization periods.

FIG. 6 shows the particular embodiment of this invention, claimed herein, that is used when it is desired to measure the thermal relaxation time ($T_1$) in the same magnetic field that is used for precession, which will be assumed to be the earth's field as in the case of well logging. There is first produced a strong polarizing magnetic field to initially polarize the nuclei in the sample. However, instead of turning the polarizing field off rapidly it is turned off slowly (for example, in 50 milliseconds) so that the nuclei in the sample, instead of precessing in the earth's magnetic field, are lined up with the earth's field. Later, at a time $t$ the nuclei are still lined up with the earth's magnetic field but have lost some of their polarization in the earth's field according to $$e\frac{-t}{T_1}$$

where $T_1$ is the thermal relaxation time of the nuclei in the earth's magnetic field. To discover just what this polarization is, there is applied a pulse of alternating magnetic field to the nuclei at the Larmor frequency of the nuclei and at an angle to the earth's field sufficient to tip the magnetic moments of the nuclei 90° relative to the earth's field. At the termination of this pulse of alternating magnetic field the free precession of the nuclei in the earth's field is detected, the initial amplitude of the free precession signal being a function of the elapsed time $t$. A series of readings are taken with progressively increasing values of $t$ and from the initial amplitudes of the successive free precession signals one may obtain a decay curve from which the thermal relaxation time $T_1$ of the nuclei may be determined.

The apparatus for accomplishing this is shown in FIG. 8 and operates as follows. Sequencer 9 consists of three brush contacts 29, 37 and 46, driven by a clock motor. When brush 29 first engages segment 31, switch 10 is actuated to couple the power source 4 through to cable 8 to the apparatus in the well bore. At this time all polarizing current from supply 4 to cable 8 must pass through sequencer 9 by means of the circuit consisting of brush 46 and segment contact 47. After a time long compared to the thermal relaxation time ($T_1$), brush 46 engages and bridges contacts 48 in sequence for the purpose of introducing resistance 49 gradially into the polarizing circuit and reduce the polarizing current slowly to zero. Although step-wise contacts 48 are shown, a segment made of resistance material, as is used in radio volume controls, giving a continuously variable resistance is also practical. At the time that most of the resistance of resistor 49 is in the circuit, brush 37 engages segment 38, actuating relay 39. The closure of this relay 39 actuates sweep generator 15 and also impresses a small D.C. voltage supplied by battery 51 onto cable 8. The purpose of this D.C. voltage is as follows: If the A.C. current supplied from supply 4 were allowed to go slowly to zero with no other voltages on cable 8, a critical point would eventually be reached where the voltage on line 8 would be unable to hold relays 6 and 7 (FIG. 2). At this point the relays would release and current in coil 1 would decrease suddenly, an undesired effect in this embodiment. The D.C. voltage or bias supplied on cable 4 has the effect of holding relays 6 and 7 while the A.C. component goes completely to zero. The D.C. has no effect on the current passing through coil 1, since transformer 5 will not pass a D.C. current. After the A.C. has gone to zero, brush 37 leaves contact 38, releasing relay 39, which thereby disconnects battery 51 so as to release relays 6 and 7 underground.

The process of supplying a pulse of alternating magnetic field of the Larmor frequency to rotate the nuclear magnetic moments 90° after decrease of the polarization to zero is accomplished as follows: After brush 29 has left segment 31, but before it engages segment 32, it engages segment 52 for a short length of time. The engagement of segment 52 triggers pulse generator 53 which in turn actuates relay 54 so that its blades engage contacts 55 for a fixed period of time of between 20 and 50 milliseconds. The engagement of contacts 55 connects audio generator 56 to cable 8 and thereby to transformer 5 and associated components. The power delivered by generator 56 is not sufficient to operate relays 6 and 7, and therefore an alternating current is supplied to coil 1 for the specified period of time.

After application of the A.C. pulse, brush 29 engages segment 32 and a free precession signal can be observed. The successive time intervals between the removal of the polarizing field and the initiation of the A.C. pulse for successive readings is variable by adjusting the time spacing between the instant brush 46 leaves the last contact of segment 48 (zero polarization) and the engagement of segment 52 by brush 29.

FIG. 7a shows superimposed oscilloscope traces of free precession signals of protons in a mixture of oil and water of a type which may be obtained with the embodiment of FIG. 6. Traces $j$, $k$ and $m$ correspond to the free precession signals obtained for different lengths of time $t$ ($t_4$, $t_5$, and $t_6$), the initial amplitudes decreasing as the lengths of time increases. The initial amplitudes of these signals lie on a curve $n$ which represents the decay of polarization. From the decrement of curve $n$, the thermal relaxation time $T_1$ in the intermediate magnetic field can easily be determined.

FIG. 7b shows a plurality of polarization decay curves $p$, $q$, $r$ and $s$ such as curve $n$ in FIG. 7a, the separate curves being obtained from substances A and B and mixtures of the same similar to the mixtures shown in FIG. 5b. Thus the polarization decay curves, representing the difference in thermal relaxation times $T_1$, produce a handy tool by which the sample under investigation may be chemically analyzed.

It should be understood that the embodiment described above for accomplishing thermal relaxation time measurements is only illustrative of methods and means by which this result may be achieved. It is obvious to those skilled in the art that modifications may be made in the apparatus disclosed above. For example, two separate coils may be used in the signal head, one coil serving to polarize the atom portions and the other coil serving to pick up the precession signal of the atom portions in the precessional magnetic field. Although the system shown in FIG. 1 transmits A.C. power into the oil well where it is converted to D.C. power for polarizing, since this is the most convenient method for oil well logging, in other embodiments of the invention the D.C. current may be supplied directly from a D.C. power source. It is also apparent that one could employ electronic computer circuitry to automatically take the output from the receiver system and compute the thermal relaxation times of the sample rather than record the polarization curves and measure the thermal relaxation time. The electronic computer method of indicating relaxation time would be more expensive of course but would be much more rapid and accurate, and thus more suitable for extended use of this invention. Since many changes could be made in the above-described constructions and many apparently widely different embodiments of this invention could be made without departing from the scope thereof, it is intended that all matter contained in the above description or shown in the accompanying drawings shall be interpreted as illustrative and not in a limiting sense.

We claim:

1. Apparatus for determining the thermal relaxation time $T_1$ of a sample of matter possessing gyromagnetic atom portions located in a first unidirectional magnetic field comprising means for providing a second unidirectional magnetic field to the sample stronger than and at an angle to said first magnetic field for polarizing the atom portions in said second magnetic field, said polarizing field being applied in successive time spaced pulses, the polarizing field in each pulse being decreased to zero slowly so that the polarized atom portions are aligned in said first magnetic field after each polarizing pulse, means for applying an alternating magnetic field of the Larmor frequency of the atom portions to the sample at an angle to said first magnetic field a spaced time period after termination of each polarizing pulse for producing a forced precession of the atom portions in said first magnetic field, the time periods between termination of the polarizing pulse and initiation of the alternating frequency field varying progressively for successive cycles, and means for detecting the free precession of the atom portions in said first magnetic field after termination of the alternating field in each cycle, the initial peak amplitudes of the successive free precession signals producing an envelope curve from which the thermal relaxation time of the sample may be determined.

2. Apparatus for determining the thermal relaxation time $T_1$ of a sample of matter possessing gyromagnetic atom portions in a first unidirectional magnetic field comprising means for providing a second unidirectonal magnetc field to the sample stronger than and at an angle to the first magnetic field for polarizing the atom portions in said second magnetic field, means for providing an alternating magnetic field of the Larmor frequency of the atom portions to the sample at an angle to said first magnetic field for producing a forced precession of the atom portion in said first magnetic field, sequencer means for operating said polarizing field means and said alternating field means in a plurality of time spaced cycles, each cycle including a strong pulse of said second magnetic field to fully polarize the atom portions in the direction of said polarizing field, followed by a slow decrease in the strength of the polarizing magnetic field to align the polarized nuclei in the direction of said first magnetic field, followed by a period of no polarization during which said polarized atom portions lose some of their polarization, followed by a pulse of said alternating magnetic field to thereby rotate the atom portions from alignment in said first magnetic field into alignment in a direction at an angle to said first field direction, followed by a period of no polarization during which said atom portions may freely precess in said first magnetic field, the time period between the termination of the decreasing polarizing field and the application of the alternating magnetic field pulse being increasingly longer for successive cycles, and means for detecting the successive free precession signals and indicating the peak amplitudes of each successive free precession signal, the peak amplitudes serving to indicate the thermal relaxation time of the sample.

3. Apparatus for logging wells by determining the thermal relaxation time $T_1$ of gyromagnetic atom portions possessing the properties of magnetic moment and gyroscopic moment and comprising portions of the formation material in sections of the well bore including means, operated repetitiously along the length of the well bore, for applying a unidirectional magnetic field to the atom portions in the well bore sections to polarize the atom portions at an angle to the earth's magnetic field, the polarizing magnetic field being applied in successive time spaced pulses, the polarizing field in each pulse being decreased to zero slowly so that the polarized atom portions are aligned in the earth's magnetic field after each polarizing pulses, means for applying an alternating frequency magnetic field of the Larmor frequency of the atom portions at an angle to the earth's magnetic field a spaced time period after termination of each polarizing pulse for producing a forced precession of the atom portions in the earth's magnetic field, the time periods between termination of the polarizing pulse and initiation of the alternating frequency field varying progressively for successive cycles, and means for detecting the free precession of the atom portions in the earth's magnetic field after termination of the alternating frequency field in each cycle, the initial peak amplitudes of the successive free precession signals producing an enveolpe curve from which the thermal relaxation time of the atom portions may be determined.

4. Apparatus for logging wells by determining the thermal relaxation time $T_1$ of gyromagnetic atom portions possessing the properties of magnetic moment and gyroscopic moment and comprising portions of the formation material in sections of the bore along the length of the well bore, including means for applying a unidirectional magnetic field to the atom portions stronger than and at an angle to the earth's magnetic field for polarizing the atom portions in said unidirectional field, means for providing an alternating magnetic field of the Larmor frequency of the atom portions to the sample at an angle to said earth's magnetic field for producing a forced precession of the atom portion in said earth's magnetic field, sequencer means for operating said polarizing field means and said alternating field means in a plurality of time spaced cycles, each cycle including a strong pulse of said unidirectional magnetic field to fully polarize the atom portions in the direction of said polarizing field, followed by a slow decrease in the strength of the polarizing magnetic field to align the polarized atom portions in the direction of the earth's magnetic field, followed by a period of no polarization during which said polarized atom portions lose some of their polarization, followed by a pulse of said alternating magnetic field to thereby rotate the atom portions from alignment in said earth's magnetic field into alignment in a direction at an angle to said earth's field direction, followed by a period of no polarization during which said atom portions may freely precess in said earth's magnetic field, the time period between the termination of the decreasing polarizing field and the application of the alternating magnetic field pulse being increasingly longer for successive cycles, and means for detecting the successive free precession signals and indicating the peak amplitudes of each successive free precession signal, the peak amplitudes serving to indicate the thermal relaxation time of the atom portions.

5. Apparatus for determining the thermal relaxation time $T_1$ of a sample of matter possessing gyromagnetic atom portions located in a first unidirectional magnetic field comprising means for applying a second unidirectional magnetic field to the sample stonger than and at an angle to said first magnetic field for polarizing the atom portions in said second magnetic field, said polarizing field being applied in successive time spaced pulses, said means including means for decreasing the polarizing field in each pulse slowly to a predetermined value so that the polarized atom portions become aligned in said first magnetic field after each polarizing pulse, means for thereafter applying an alternating magnetic field of the Larmor frequency of the atom portions to the sample at an angle to said first magnetic field a spaced time period after said predetermined decreased value has been reached for each polarizing pulse for producing a forced precession of the atom portions in said first magnetic field, the time periods between the time when said predetermined decreased value has been reached for the polarizing pulse and initiation of the alternating frequency field varying progressively for successive cycles, and means for detecting the free precession of the atom portions in said first magnetic field after termination of the alternating field in each cycle, the initial peak amplitudes of the successive free precession signals producing an envelope curve from which the thermal relaxation time of the sample may be determined.

6. Apparatus for well logging by determining the thermal relaxation time $T_1$ of gyromagnetic atom portions possessing the properties of magnetic moment and gyroscopic moment and comprising portions of the formation material in sections of the well bore and performed repetitiously along the length of the well bore, including means for applying a unidirectional magnetic field to the atom portions in the well bore sections to polarize the atom portions at an angle to the earth's magnetic field, the polarizing magnetic field being applied in successive time spaced pulses, said means including means for decreasing the polarizing field in each pulse slowly to a predetermined value so that the polarized atom portions become aligned in the earth's magnetic field after each polarizing pulse, means for thereafter applying an alternating frequency magnetic field of the Larmor frequency of the atom portions at an angle to the earth's magnetic field a spaced time period after said predetermined decreased value has been reached for each polarizing pulse for producing a forced precession of the atom portions in the earth's magntic field, the time periods between the time when said predetermined decreased value has been reached for the polarizing pulse and initiation of the alternating frequency field varying progressively for successive cycles, and means for detecting the free precession of the atom portions in the earth's magnetic field after termination of the alternating frequency field in each cycle, the initial peak amplitudes of the successive free precession signals producing an envelope curve from which the thermal relaxation time of the atom portions may be determined.

References Cited

UNITED STATES PATENTS

| 2,973,471 | 2/1961 | Armistead | 324—0.5 |
| 3,019,383 | 1/1962 | Varian | 324—0.5 |
| 3,083,335 | 3/1963 | Schuster | 324—0.5 |

RUDOLPH V. ROLINEC, *Primary Examiner.*

MAYNARD R. WILBUR, *Examiner.*